Patented Oct. 4, 1932

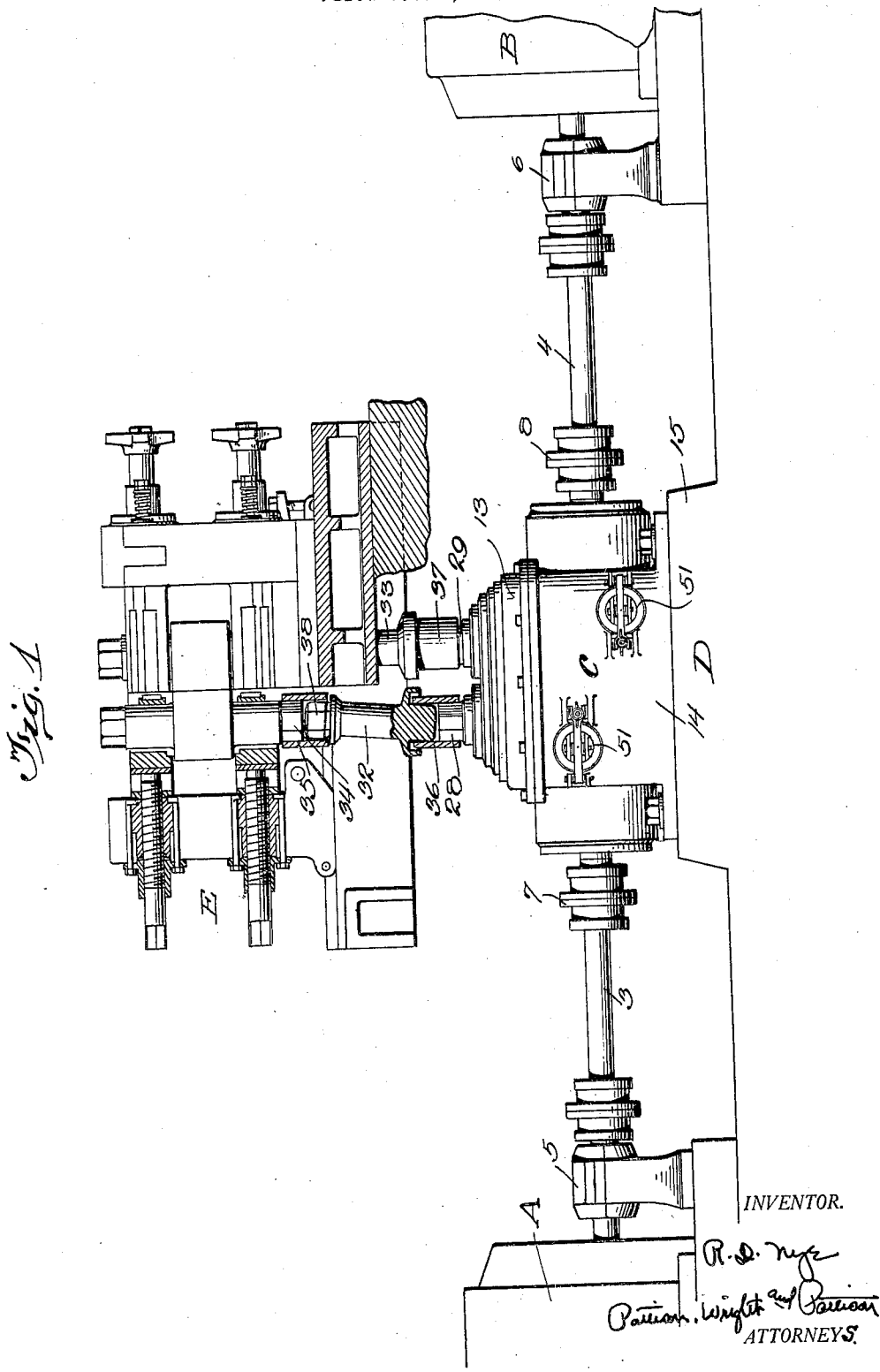

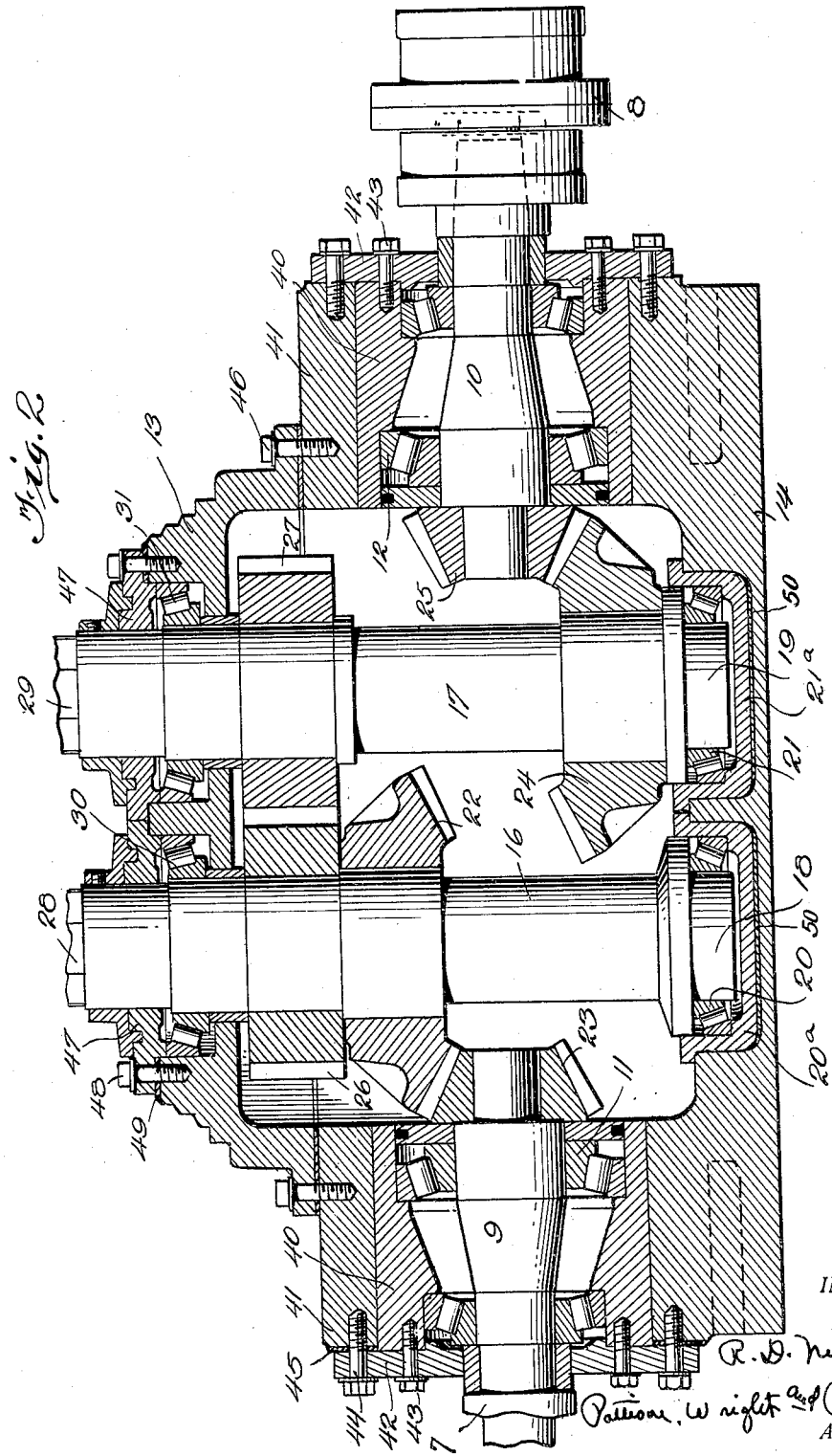

1,880,468

UNITED STATES PATENT OFFICE

RALPH D. NYE, OF WHEELING, WEST VIRGINIA, ASSIGNOR TO WHEELING MOLD & FOUNDRY DIVISION OF THE CONTINENTAL ROLL & STEEL FOUNDRY COMPANY, OF WHEELING, WEST VIRGINIA, A CORPORATION OF DELAWARE

ROLLING MILL

Application filed October 1, 1930. Serial No. 485,745.

This invention relates to improvements in rolling mills being more particularly and specifically directed to an improved drive arrangement for vertical rolling mills.

The primary object of the invention is the provision of the improved drive for vertical rolling mills.

A further object of the invention is the provision of an improved drive gear unit for vertical rolling mills wherein two drive motors are utilized and provision is made for synchronizing the drives of said motors.

Other specific features of the improvement, novel features of construction and improved results of the invention will appear from the following description and accompanying drawings.

In the drawings:

Figure 1 is a view in side elevation showing the general arrangement of a mill having applied thereto my improved driving unit, a portion of the figure being broken away and shown in vertical section.

Figure 2 is an enlarged vertical sectional view through the gears of the driving unit.

Referring now to the drawings and designating therein similar parts by similar reference numerals throughout the description, A and B designate two electric motors for driving the shafts 3 and 4 which shafts at their ends adjacent the motors are supported in suitable bearings 5 and 6. At their ends remote from the motors these shafts are connected by suitable couplings 7 and 8 to the stub-shafts 9 and 10, which are rotatably supported in tapered roller bearings 11 and 12, in the ends of the gear housing C, which housing is made up of a main portion 14 and a cover 13 supported upon an elevated portion 15 of a base D which is also a common support for the motors A and B.

Referring now particularly to Fig. 2 of the drawings, it will be seen that there are two vertically arranged shafts 16 and 17 within the housing C arranged therein in spaced parallel relation with their lower ends 18 and 19 supported upon tapered roller bearings 20 and 21 supported in removable cap-like housings 20ª and 21ª arranged in the inner face of the bottom 14 of the gear housing.

Intermediate its length, the vertical shaft 16 carries a fixed gear 22, which meshes with a gear 23 carried by the inner end of the shaft 9. Adjacent its lower end the shaft 17 carries a gear 24 which meshes with a gear 25 carried by the inner end of the shaft 10.

Adjacent their upper ends, but still within the gear housing, the vertical shafts 16 and 17 carry what I have termed synchronizing gears 26 and 27, the teeth of which mesh in the space between the shafts.

The upper ends of the shafts 16 and 17 extend outwardly through the top of the gear housing and have squared ends 28 and 29. Adjacent their upper ends these shafts are kept in alignment within the housing by the tapered roller bearings 30 and 31.

Referring now to Fig. 1 of the drawings, wherein the mill arrangement is illustrated as an entirety by E, it will be seen that the upper ends 28 and 29 of the vertical shafts 16 and 17 have a driving connection with the vertical mill rolls through suitable vertical drive connectors 32 and 33.

The mill rolls have squared ends 34 and to these ends are applied squared downwardly extending collars 35, while to the squared ends 28 and 29 of the vertical shafts 16 and 17 are applied upwardly extending driving collars 36 and 37. The mill roller drive connectors 32 are provided with squared ends as clearly indicated at 38, which fit into and have driving connection with the extending ends of the angular collars 35, 36 and 37.

This arrangement makes it possible to drive the mill rolls even though they be out of vertical alignment with the vertical shafts 16 and 17, as clearly indicated in Fig. 1 of the drawings.

It is intended that the drive motors A and B be driven or operated in such a manner as to maintain as nearly as possible an identical speed in each motor, but in the event the two motors do not have exactly the same speed the synchronizing gears 26 and 27 will insure that the mill rolls are driven at similar speeds. These synchronizing gears 26 and 27 will maintain a positive speed relation between the vertical shafts 16 and 17 and hence a similar drive speed of the mill rolls.

These synchronizing gears of the drive unit will further insure an equal division of the total load upon the drive motors A and B.

By reason of the synchronizing gears it will be seen further that the vertical drive shafts 16 and 17 are mechanically interlocked with the result that either one or both drive motors may be used in the operation of the mill as desired or required.

The drive arrangement has the further advantage of a maximum compactness of the drive equipment and due to the mechanical construction of the drive unit, it is contained within a relatively small gear housing.

It will be, of course, understood that the drive gears of the unit will rotate in the housing in a suitable lubricant.

The arrangement furthermore reduces materially the height of a vertical rolling mill, thus permitting a reduction of head room in the factory or place where the mill is installed.

The tapered roller bearings 11 and 12 make it possible to maintain the proper adjustment between the gears 22 and 23 and the gears 24 and 25 for the reason that these bearings and the gears carried by the shafts 9 and 10 can be forced or moved inwardly. The structure making this possible is that each bearing is held in place by an elongated collar 40 slidable within the tubular portions 41 of the gear housing. These collars are attached to caps 42 by bolts 43 and the caps in turn are fastened to the ends of the tubular portions of the housing by bolts 44. Thus it will be seen by the placement of or removal of shims such as illustrated at 45 adjustment of the bearings and gears can be had.

The cover 13 of the gear housing is bolted in place as indicated at 46. The tapered roller bearings 30 and 31 in the housing cover at the point where the vertical shafts 16 and 17 pass through the cover are held in place by caps 47 bolted as at 48 to the cover. This construction makes it possible to adjust these bearings and shims 49 are provided which shims can be removed or reduced in thickness as the bearings wear so as to permit adjustment of them.

The adjustment of the tapered roller bearings 20 and 21 which are supported in the cap-like housings 20ª and 21ª is had by the provision of shims 50 positioned between the housing bottom and the caps. By reducing the thickness of or completely removing these shims adjustment of these tapered bearings is obtained.

In the adjustment of the bearings 11 and 12 and the gears 23 and 25 it is essential that these gears be seen and to this end the gear housing 13 is provided with doors 51. These doors are so positioned that by opening them the gears 22 and 23 and the gears 24 and 25 are visible for inspection and during the time adjustment is made of them as wear in the gears or bearings may necessitate.

Having thus described my invention what I claim and desire to secure by Letters Patent is:

1. In combination with a vertical rolling mill, a drive for the mill rolls comprising independent drive motors for each roll, a gear housing having therein a pair of vertically arranged shafts each having driving connection with a mill roll, one of said shafts being driven by one drive motor and the other shaft by the other drive motor, and gears fixed to said vertical shafts and meshing with one another to positively synchronize the drive speeds of the shafts and the mill rolls.

2. In combination with a vertical rolling mill, a drive unit comprising a housing positioned beneath the mill and having therein a pair of vertically disposed shafts the upper ends of which have driving connection with rolls in said mill, the lower ends of said shafts rotatably supported in bearings in the bottom of said housing, a pair of independent drive motors having independent elongated shafts extending into the opposite ends of said housing and each having geared connection with one of said vertical shafts, and means within said housing comprising intermeshing gears fixed to said vertical shafts for positively synchronizing the speed of said vertical shafts and the drive speed of said mill rolls.

3. In combination with a vertical rolling mill, an improved drive unit for the rolls thereof, comprising a gear housing positioned beneath said mill, a pair of vertically disposed shafts in said housing in separated parallel relation, each of said shafts having a drive connection with a mill roll, a pair of independent drive motors, each of said motors having an elongated shaft extending into said housing and carrying therein a drive gear, the drive gear of one motor meshing with a gear carried intermediate the length of one of said vertically disposed shafts and the drive gear of the other motor having driving connection with a gear carried by one end of the other vertically disposed shaft, and said vertically disposed shafts having positive driving connection with one another, whereby the speed of said vertical shafts are positively synchronized, for the purpose described.

4. A drive unit for vertical rolling mills comprising a housing having mounted therein on tapered bearings a pair of vertical shafts for connection with the mill rolls, a pair of horizontally disposed driven shafts mounted in said housing on tapered bearings, driving connection between the driven shafts and the vertical shafts, and means to adjust said bearings to take up any wear thereof.

5. An improved drive unit for a vertical rolling mill, comprising a housing, vertically disposed shafts in said housing having driving connection with the rolls of the mill, horizontally disposed driven shafts in said housing for driving said vertical shafts, all of the shafts within said housing supported upon tapered roller bearings, and means to move said bearings longitudinally of said shafts for adjusting them for the compensation of wear.

6. An improved drive unit for a rolling mill comprising a pair of shafts arranged in separated parallel relation within a housing and having driving connection with the rolls of the mill, a driven shaft for each of said first mentioned shafts and having driving connection therewith, the driven shafts supported within the housing upon tapered roller bearings, said roller bearings supported within and movable with a collar slidable in said housing, means to slide said collar to move the bearings longitudinally of the shaft to adjust them for compensation of wear, one end of the parallel shafts supported in roller bearings carried in movable caps positioned in the housing, means to move said caps longitudinally of the shafts for adjusting the bearings for the compensation of wear, said parallel shafts passing through the top of said housing and held in alignment therein by tapered roller bearings, and means to move said bearings longitudinally of said shafts for the purpose of adjusting them for the compensation of wear.

7. In combination with a rolling mill, a drive for the mill rolls comprising independent drive motors for each roll, a pair of parallel shafts each having driving connection with a mill roll, one of said shafts being driven by one drive motor and the other shaft by the other drive motor, and gears fixed to said shafts and meshing with one another to positively synchronize the drive speeds of the shafts and the mill rolls.

In testimony whereof I hereunto affix my signature.

RALPH D. NYE.